United States Patent [19]
McCullough et al.

[11] 3,799,637
[45] Mar. 26, 1974

[54] FLEXIBLE BEARING MATERIAL
[75] Inventors: Edward E. McCullough, Brigham Ctiy, Utah; Stanley P. Desjardins, Scottsdale, Ariz.
[73] Assignee: Thiokol Chemical Corporation, Bristol, Pa.
[22] Filed: Apr. 3, 1972
[21] Appl. No.: 240,497

[52] U.S. Cl. ............................................. 308/238
[51] Int. Cl. ............................................. F16c 27/00
[58] Field of Search ................. 308/2, 238; 267/152

[56] References Cited
UNITED STATES PATENTS
1,215,216   2/1917   Swartz ............................... 152/211
2,084,784   6/1937   Stahl .................................. 152/211
2,171,438   8/1939   Tarbox ............................... 152/211
2,511,690   6/1950   Bergen ............................... 152/211

Primary Examiner—Charles J. Myhre
Assistant Examiner—Frank Susko
Attorney, Agent, or Firm—Edward E. McCullough

[57] ABSTRACT

A material for flexible bearings that resists compressive loads along one axis but permits lateral or shear motion along axes perpendicular thereto is made of an elastomer densely filled with rigid, uniformly oriented platelets.

8 Claims, 3 Drawing Figures

FLEXIBLE BEARING MATERIAL

CROSS-REFERENCE TO RELATED PATENT APPLICATION

This application is somewhat related to another, owned by the same assignee, titled "Flexible Bearings and Process for Their Manufacture" by R. E. Lee, et al., Ser. No. 621,011, filed Mar. 6, 1967, now U. S. Pat. No. 3,429,622.

BACKGROUND OF THE INVENTION

This invention relates to bearings, and more particularly to improvements in flexible bearings having alternate laminations of rigid and elastomeric layers and to improved methods for making such bearings. The invention herein described was made in the course of or under a contract with the U. S. Air Force.

Flexible bearings that have alternate laminations of rigid and elastomeric layers are known in the prior art. Such bearings have lateral flexibility and are relatively incompressible in a direction perpendicular to their laminations. For these reasons such laminated bearings have been used for supporting members, such as bridge girders, that shift relative to their supports. In the rocket industry, such bearings have been adapted for use in attaching movable thrust nozzles in rocket cases. For this use the weight, compressibility, and shear modulus of the laminated bearing must be precisely controlled. Also, since it is desirable that such thrust nozzles be rotatable about a fixed point on the axis of the rocket, each of the rigid laminae must be manufactured separately to conform to a spherical surface having its own unique radius, concentric about that point. This tends to make the manufacture of such annular bearings excessively time consuming, difficult, and costly.

Also, small spacers must be embedded in each elastomeric layer to insure uniform spacing between the rigid laminae. This operation, usually done by hand, contributes further to the time and effort required to manufacture conventional bearings of this type.

SUMMARY OF THE INVENTION

The present invention, which overcomes these difficulties to a great extent, provides an elastomeric material densely filled with tiny rigid platelets that are uniformly oriented in parallel planes. This material can be formed in a thick sheet from which laminae can be made such that each will replace several elastomeric and rigid laminae in flexible bearings. This material has the physical characteristics of the bearing as a whole, i.e., it is relatively incompressible in directions perpendicular to the platelets but is flexible laterally. Since it can easily be curved to conform to any radius, each lamina of the material of the invention effectively provides a continuum of radii through its thickness so that it performs the concentricity functions of several costly rigid laminae it may replace. This greatly simplifies the manufacture of flexible bearings for rocket nozzles by elminating the majority of rigid laminae, promoting both the economic feasibility and reliability thereof. Also, since this material is virtually incompressible in directions perpendicular to the platelets, the conventional spacers are unnecessary to insure uniform spacing between the rigid laminae of the bearing.

The material of the invention may be made by spreading thin, partially cured layers of elastomer with layers of rigid platelets, stacking such layers to the thickness desired, and curing it under heat and pressure in vacuum.

Objects of the invention are to provide an elastomeric material that is characterized by being substantially incompressible along one axis, but permitting shear flexibility along axes perpendicular thereto. Another object of the invention is to provide an elastomeric material that incorporates within itself the physical properties of alternate elastomeric and rigid laminae so that fewer rigid laminae are necessary in such a bearing. Another object of the invention is to provide a flexible bearing wherein spacers are unnecessary. Another object of the invention is to provide a material that contributes to the ease of manufacture, economic feasibility, and to the reliability of the resulting bearing. An important feature of the invention is that in certain applications it can be used as a flexible bearing without the inclusion of rigid laminae therein.

Other objects and features of the invention will become apparent as the following detailed description is read with reference to the accompanying drawings, wherein the same parts are designated by identical numerals throughout the disclosure.

DESCRIPTION OF THE PREFERRED EMBODIMENTS

The material of the invention essentially consists of an elastomeric composition 11, such as polyisoprene rubber, densely filled with steel platelets 12 that are uniformly oriented in parallel planes. Although a synthetic rubber is a preferred material for the elastomer 11, many other elastomeric materials can be used for this purpose. The platelets are preferable steel, approximately one-sixteenth inch in dia., and about 0.005 inch thick. However, they may be virtually any rigid material and of various sizes depending on the application of the bearing.

The material may be made by spreading a layer of platelets 12 on the surface of a thin film of uncured elastomer 11, covering this with a second film of uncured elastomer 11 and repeating the process until the desired thickness is obtained. This is preferably done in a vacuum to eliminate bubbles or voids. Pressure is then applied to the material and it is heat cured. Alternatively, a layer of platelets 12 may be sprayed with liquid elastomer, which is covered with a second layer of platelets. This layer of platelets is then sprayed with the second layer of elastomer and the process repeated until the desired thickness is obtained. The resulting material is similarly heat treated until cured.

Figure 1:
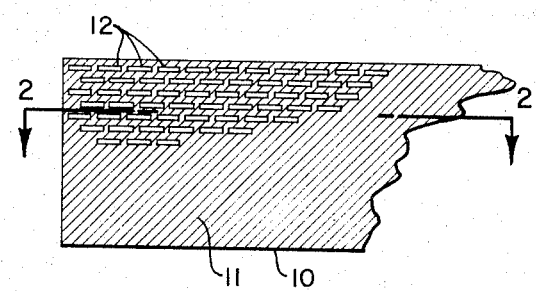
FIG. 1 is a cross sectional view of the material of the invention.
Figure 2:
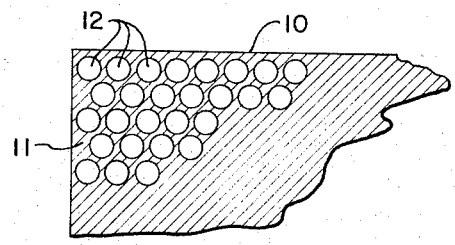
FIG. 2 is a sectional view taken on line 2—2 of FIG. 1.
Figure 3:
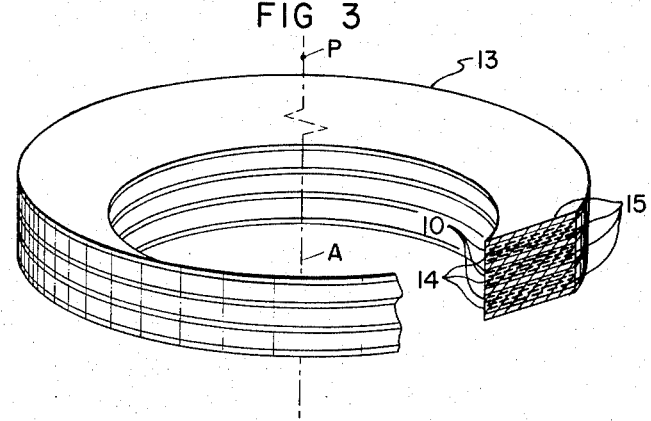
FIG. 3 is a perspective view, partially in section, of a typical bearing for a rocket nozzle incorporating the material of the invention.

FIG. 3 illustrates a typical use of this material to form an annular flexible bearing 13 that may be used to support a movable rocket nozzle in a rocket case, not shown. Thick laminae 14 of the material 10 are alternately stacked with thin steel laminae 15, to which they are bonded. The steel laminae 15 conform to concentric spherical surfaces about a common point P on the axis A of the bearing. To accomplish this purpose, each steel lamina 15 has its own unique radius, and each elastomeric lamina 14 of the material 10 is automatically formed to provide a radii continuum between the adjacent steel laminae 15. In this way the physical characteristics of providing lateral flexibility and axial incompressibility, provided by the multiplicity of steel laminae in conventional bearings, are provided by the material 10 so that fewer of the difficult-to-make steel laminae 15 are necessary to accomplish this purpose. An additional advantage is that the steel spacers described in the cited patent, which are necessary to achieve uniformity of construction in conventional bearings, are no longer necessary because of the axial incompressibility of the material 10.

It may be seen that the platelets, being uniformly oriented in parallel planes, may move relative to one another in those planes, but they may not move in directions perpendicular to those planes. This gives the material of the invention the property of being laterally flexible but almost inflexible and incompressible in directions perpendicular to the platelets.

An invention has been described that constitutes an advance in the art of flexible bearing construction. Although the embodiments have been described with considerable specificity with regard to detail, it should be noted that such details may be altered considerably without departing from the scope of the invention as it is defined in the following claims.

We claim:

1. A flexible bearing material comprising:

a cured elastomer; and
   a multiplicity of flat, thin, rigid platelets uniformly and densely distributed throughout the elastomer and oriented in substantially parallel planes, whereby the material is substantially incompressible in a direction perpendicular to the platelets but is flexible to shear forces exerted parallel thereto.

2. The material of claim 1 wherein the elastomer is a rubber.

3. The material of claim 1 wherein the platelets are of steel.

4. The material of claim 1 wherein the platelets are about one-sixteenth inch dia., and about 0.005 inch thick.

5. A flexible bearing for supporting a movable thrust nozzle in a rocket case comprising an annulus made of alternately stacked and bonded together laminae of rigid and flexible bearing material, the flexible material comprising an elastomer densely filled with rigid platelets substantially oriented to conform to the curvature of the laminae.

6. The flexible bearing of claim 5 wherein all of the laminae conform to spherical surfaces concentric about a fixed point.

7. The flexible bearing of claim 5 wherein the elastomer of the bearing material is a rubber.

8. The flexible bearing of claim 5 wherein the rigid platelets are of steel, about one-sixteenth inch in dia., and about 0.005 inch thick.

* * * * *